(12) United States Patent
Rossman et al.

(10) Patent No.: US 11,067,659 B2
(45) Date of Patent: Jul. 20, 2021

(54) SYSTEM AND METHOD FOR RANK ESTIMATION OF ELECTROMAGNETIC EMITTERS

(71) Applicant: BAE SYSTEMS INFORMATION AND ELECTRONIC SYSTEMS INTEGRATION INC., Nashua, NH (US)

(72) Inventors: Court E. Rossman, Merrimack, NH (US); Costin Barbu, Salem, NH (US); Thomas R. Vaccaro, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 579 days.

(21) Appl. No.: 15/380,310

(22) Filed: Dec. 15, 2016

(65) Prior Publication Data
US 2018/0172794 A1   Jun. 21, 2018

(51) Int. Cl.
*G01S 3/04*   (2006.01)
*G01S 3/74*   (2006.01)
*G01S 3/781*  (2006.01)

(52) U.S. Cl.
CPC ........... *G01S 3/04* (2013.01); *G01S 3/74* (2013.01); *G01S 3/781* (2013.01)

(58) Field of Classification Search
CPC ... G01S 3/04; G01S 7/021; G01S 3/74; G01S 3/781
See application file for complete search history.

(56) References Cited

U.S. PATENT DOCUMENTS

| 6,765,532 | B2 | 7/2004 | Vaccaro et al. |
| 7,372,404 | B2 | 5/2008 | Shirai et al. |

*Primary Examiner* — Matthew M Barker
(74) *Attorney, Agent, or Firm* — Sand, Sebolt & Wernow LPA; Scott J. Asmus

(57) ABSTRACT

A system and method for rank estimation of electromagnetic emitters is provided. One exemplary feature of the system and method includes the use of a Fixed Sigma Gaussian Mixture Model (FSGMM) to determine a rank estimation of electromagnetic emitters. Another exemplary feature of the system and method includes the use of a Gaussian Mixture Model (GMM) clustering approach in conjunction with an Akaike Criterion Information (AIC) to determine a number of clusters and associated statistics of emitters.

14 Claims, 15 Drawing Sheets

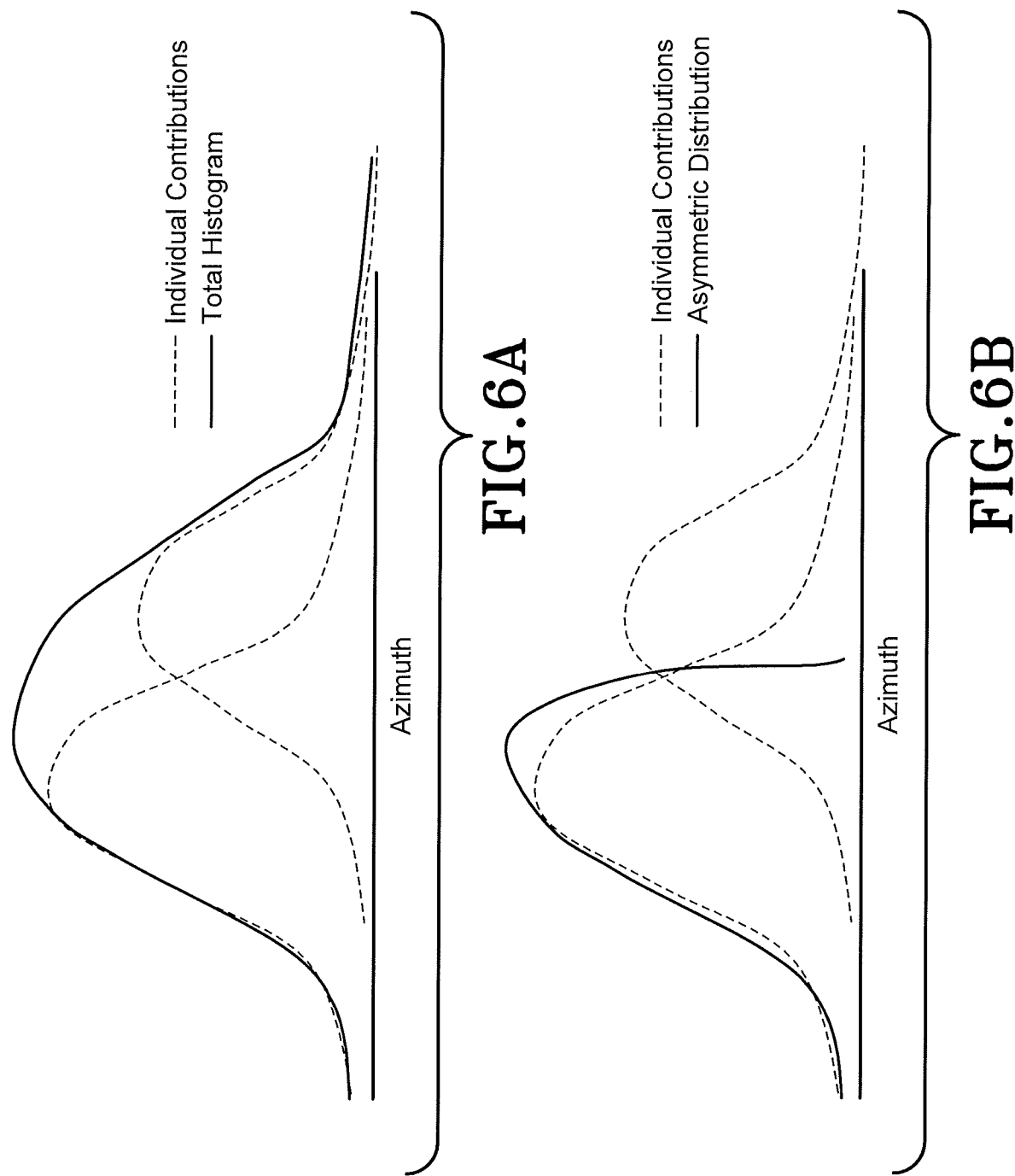

SYSTEM AND METHOD FOR RANK ESTIMATION OF ELECTROMAGNETIC EMITTERS

STATEMENT OF GOVERNMENT INTEREST

This present disclosure was made with United States Government support under Contract No. 4100997388. The United States Government has certain rights in this disclosure.

TECHNICAL FIELD

The present disclosure relates generally to ranking. More particularly, the present disclosure relates to rank estimation. Specifically, the present disclosure relates to rank estimation of electromagnetic emitters.

BACKGROUND INFORMATION

Generally, in military telecommunications, Electronic Support Measures (ESM) involve, amongst other things, searching for, intercepting, identifying and locating sources of radiated electromagnetic energy for the purpose of immediate threat recognition. For example, ESM include estimating the number of emitters (e.g. radars at different locations). Although many systems and methods of estimating the number of emitters have been developed, such systems and methods have some shortcomings.

For example, many systems and methods employ unconstrained programs which make it difficult to estimate the number of emitters, including, but not limited to, estimating co-channel emitters. Further, many systems and methods are computationally-intensive which is a disadvantage when immediate threat recognition is necessary. Therefore, there is a need for an improved system and method for rank estimation of emitters.

SUMMARY

Inasmuch as current ranking estimation systems and methods are insufficient in some cases, an improved system and method for rank estimation of electromagnetic emitters is, therefore, needed. The present disclosure addresses these and other issues by establishing a system and method for rank estimation of electromagnetic emitters.

In one aspect, an embodiment of the disclosure may provide a method comprising measuring Angles of Arrival (AoAs) of at least one signal from at least one electromagnetic emitter received at a detection system and estimating an accuracy of the measured AoAs by the detection system. This embodiment may further provide assigning a track to the AoAs and creating a histogram of the AoAs versus azimuth. This embodiment may further provide fitting a Fixed Sigma Gaussian Mixture Model (FSGMM) to the histogram, determining a rank estimation of the at least one electromagnetic emitter and reporting the track associated with the at least one electromagnetic emitter.

In another aspect, an embodiment of the disclosure may provide a method comprising measuring Angles of Arrival (AoAs) of at least one signal from at least one electromagnetic emitter received at a detection system and creating a bar graph of the measured AoAs where a y-axis of the bar graph is the number of AoAs (counts) and an x-axis of the bar graph is measurement values. This embodiment may further include providing an initial estimated number of clusters and applying Gaussian Mixture Model (GMM) clustering to the measured AoAs in an iterative manner. This embodiment may further provide determining an optimal solution and reporting the optimal solution.

BRIEF DESCRIPTION OF THE SEVERAL VIEWS OF THE DRAWINGS

A sample embodiment of the present disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 6A is a histogram with contributions from two emitters.

FIG. 6B is a histogram having asymmetric distribution as a result of hard assignments to individual AoA tracks and only sending AoAs from one track to the FSGMM program.

Similar numbers refer to similar parts throughout the drawings.

DETAILED DESCRIPTION

Figure 1:
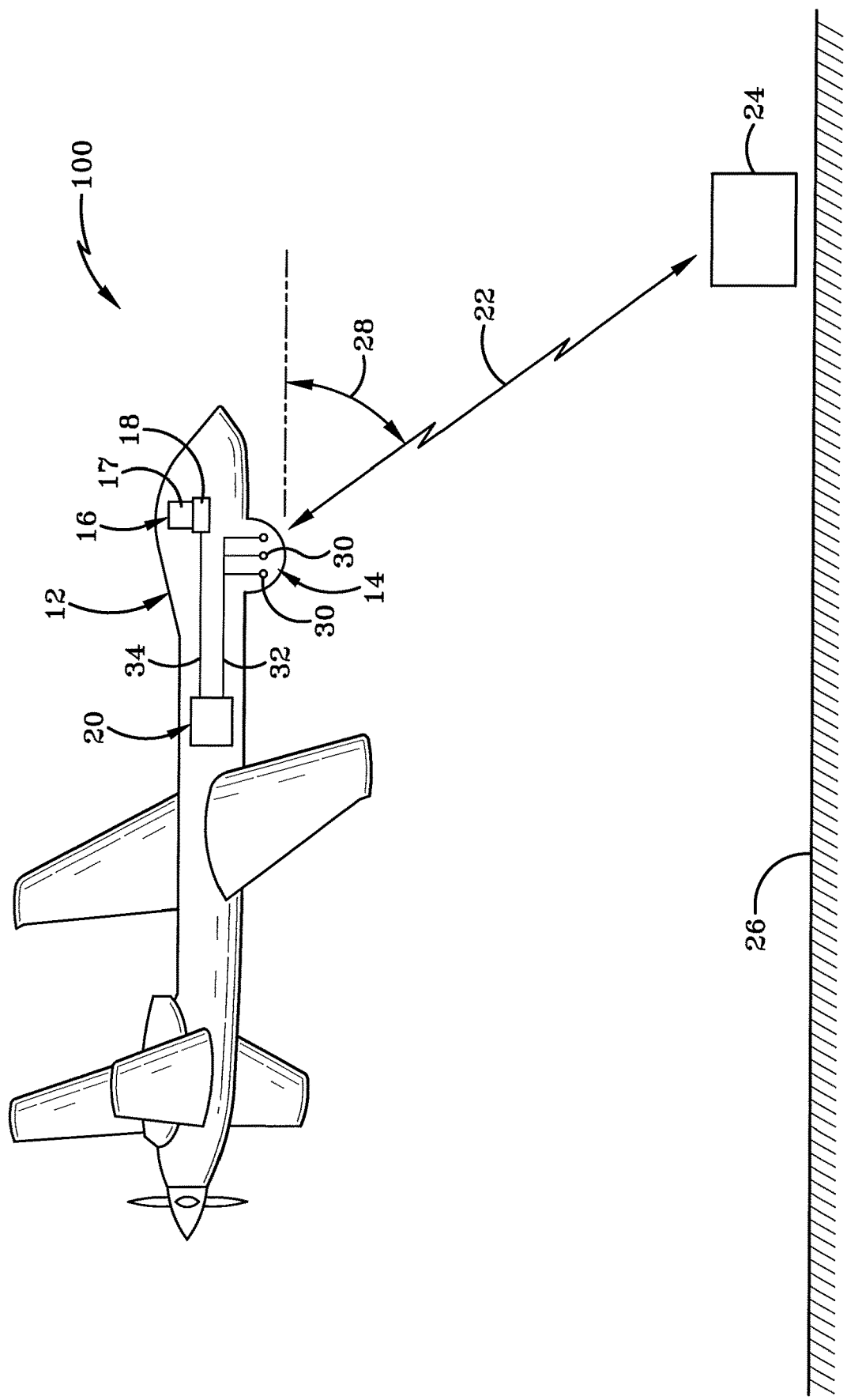
FIG. 1 is a general diagrammatic view of an embodiment of a ranking estimation system.

As depicted in FIG. 1, a ranking system for determining a rank estimation of electromagnetic emitters is broadly depicted as 100. Ranking system 100 may include a vehicle 12 carrying a detection system 14, a computer 16 operatively coupled to a memory 17 and a processor 18, a network connection 20, and at least one electromagnetic signal 22 coming from at least one electromagnetic emitter 24 detected by the detection system 14.

In accordance with one aspect of the disclosure, vehicle 12 is a flying device configured to move above the geographic landscape 26. Vehicle may be an aircraft, a drone or unmanned aerial vehicle (UAV) as one having ordinary skill in the art would understand. In another example, the vehicle refers to planes, helicopters, zeppelins, balloons, space shuttles, and the like. In another aspect according to the present disclosure, the vehicle 12 may be a ground-based vehicle or a water-based vehicle, such as a military land vehicle and a military warship respectively.

Detection system 14 is carried by vehicle 12 and may be selected from a group of known detection systems 14 capable of determining Angle of Arrival (AoA) 28 calculations of the at least one electromagnetic signal 22 coming from the at least one electromagnetic emitter 24, such as any suitable direction finding (DF) system. In one aspect according to the present disclosure, it is important to know the accuracy of the detection system 14. The DF system may report the measured AoA 28 and the expected accuracy of the AoA 28. In one embodiment according to the present disclosure, the accuracy of the DF system is a function of signal-to-noise ratio (SNR), of attitude (i.e. roll-pitch-yaw, if the DF system is on an aerial-based vehicle) and of the magnitude of the correlation interferometry direction finding (CIDF) correlation as one of ordinary skill in the art would understand. The at least one electromagnetic signal 22 may be transmitted in any one of a number of frequencies, including radar, communication, and other types of signals. The detection system 14 may calculate AoA 28 predictions and AoA 28 accuracy estimates based on measured voltages of the electromagnetic signals 22 received by at least one sensor 30, such as an antenna array, of the detection system 14.

In accordance with one aspect of the present disclosure, the processor 18 of the ranking estimation system 100 may be a radio frequency (RF) processor. The processor 18 may utilize various techniques to calculate the AoA 28 predictions and the AoA 28 accuracy estimates, including, but not limited to, time difference of arrival (TDOA), amplitude comparison and phase interferometry techniques, amongst any other suitable technique as one of ordinary skill in the art would understand. The ranking system 100 in one example is powered from the vehicle and in another example the ranking system 100 has its own power source.

Network 20 allows the transmittal of data from the at least one sensor 30 to the processor 18 and memory 17 in computer 16. In one particular embodiment, Network 20 is preferably an encrypted and secure high-speed internet or intranet. When the at least one sensor 30 captures the at least one electromagnetic signal 22, the at least one electromagnetic signal is transmitted to network 20 via a first network connection 32. Processor 18 is operatively coupled to network 20 via a second network connection 34.

Further, while computer 16 is depicted as being carried by the vehicle 12, it is entirely possible that the computer 16 is remote from the vehicle 12. According to one aspect of the present disclosure, when the computer 16 is carried by the vehicle 12, the ranking process (described in greater detail below) occurring in memory 17 and processor 18 occurs onboard vehicle 12. In this latter aspect, the ranking processing would be performed on the vehicle 12 and the network 20 refers to the internal network within the vehicle.

According to one aspect of the present disclosure, the ranking estimation of the at least one emitters 24 is performed in processor 18 utilizing a track splitting code, such as a Fixed Sigma Gaussian Mixture Model (FSGMM). To accomplish the ranking estimation, computer 16 and processor 18 may operate in conjunction with memory 17, a plurality of input/output ports which may be operably connected by a bus.

In accordance with one aspect of the present disclosure, the computer 16 includes rank estimation logic configured to provide accurate rank estimation results. In different examples, the rank estimation logic may be implemented in hardware, software, firmware, and/or combinations thereof. Thus, the ranking estimation logic may provide means (e.g., hardware, software, firmware) of ranking emitters 24 by performing an FSGMM fit to a histogram of the measured AoAs 28 versus azimuth which is described further detail below.

Computer 16 operates in the network 20 environment and thus may be connected to other the network devices (not shown) via the i/o interfaces, and/or the i/o ports. Through the network 20, the computer 16 may be logically connected to other remote computers. Networks with which the computer may interact include, but are not limited to, a local area network (LAN), a wide area network (WAN), and other networks. The networks may be wired and/or wireless networks.

The following paragraphs relate to the steps for a method of rank estimation. The method is accomplished by a Memory 17 and processor 18 which operate to collectively to define a non-transitory computer-readable medium storing a plurality of instructions which when executed by one or more processors causes the one or more processors to perform the method for rank estimation of emitters 24. The plurality of instructions for the rank estimation may include, amongst other things, instructions for estimating the rank of emitters 24 through an FSGMM step, wherein the FSGMM step includes fitting various bell curves, having a fixed width, to a histogram of AoAs 28 versus azimuth. The plurality of instructions may include instructions for running a rank selection metric. Further, the instructions may run false track protection measures before reporting the rank prediction.

In accordance with one aspect of the present disclosure, the method for rank estimation utilizes the FSGMM to estimate the rank of emitters 24 based on AoA 28 calculations. In one particular embodiment, AoAs 28 are measured in real-time and are assigned to a particular track, which is a Kalman Filter (KF) track, as one of ordinary skill in the art would understand. If AoAs 28 in a cluster of AoAs 28 are within a certain distance from one another, as described in greater detail below, then all AoAs 28 in that particular cluster are assigned to the same track. Further, the AoAs 28 within that cluster are stored by the computer 16 within that particular track. Periodically, the AoAs 28 in that cluster are reviewed to determine if there is more than one track in the direction of that particular track by utilizing a batch process program, such as FSGMM, and as further described below.

FSGMM accomplishes a quick estimate of rank, as a pre-selector filter, by utilizing a batch process program on stored AoAs 28. The term "quick estimate" refers to an estimate that is not computationally-intensive and that has a fast throughput on a computer system. If the FSGMM predicts a higher rank than what the assumed rank should have been (e.g. a prediction of two emitters 24 instead of an assumed one emitter 24), then a computationally-intensive algorithm or program is utilized to confirm the prediction of the additional emitter 24.

The method for rank estimation of emitters 24 utilizes an FSGMM. The AoA 28 data in the AoA 28 distribution is assumed to be symmetric which forms a Gaussian distribution per emitter 24. The method creates a histogram of a particular set of AoAs 28 versus azimuth angle. Various bell curves, of fixed width, are utilized to fit the histogram. The minimum number of bell curves that fit the histogram, within an established noise accuracy, is the returned rank of emitters 24 of the program. When using bell-curve fitting to the AoAs 28 histogram, a constant DF sigma for all emitters 24 and AoAs 28 is assumed to allow simple Gaussian bell curves to fit the AoA 28 distribution. The FSGMM program is designed for AoAs 28 with similar frequencies and will degrade when the AoAs 28 have broadly different frequencies. Therefore, an average sigma for all of the AoA 28 data needs to be selected before calling FSGMM.

If the emitters 24 and sensors 30 of the DF system are fixed, the physics or geometry in this case is accurately represented by the one dimensional AoA 28 histogram. Because the emitters 24 and sensors 30 are not moving, the AoAs 28 measured at a previous time would still be the same for AoAs 28 measured at a current or subsequent time. Further, the range from the DF system to the emitters 24 has no effect because the emitters 24 and sensors 30 are not in motion.

Figure 2A:
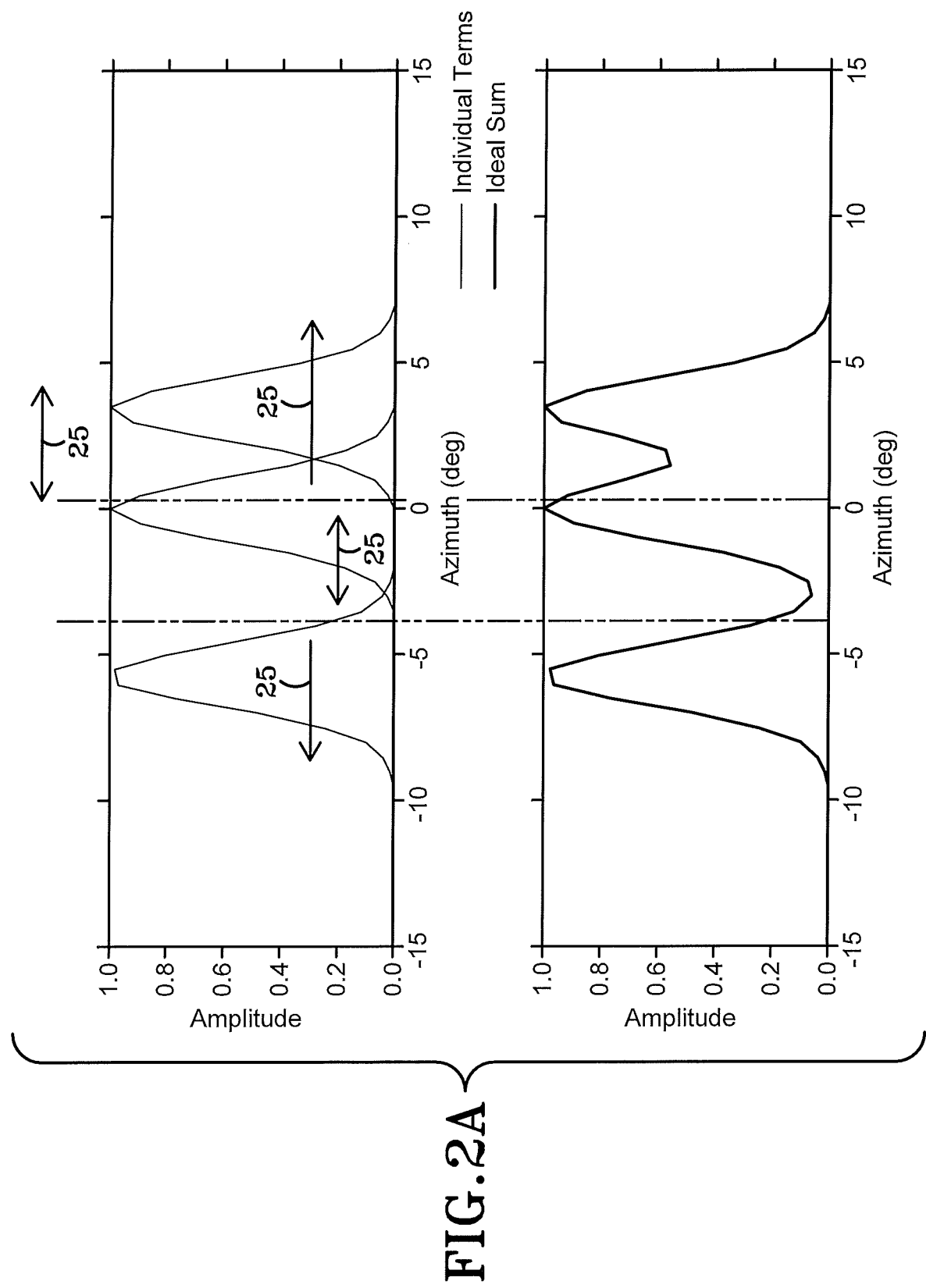
FIG. 2A is a graphical representation of a fixed, ideal distribution of three emitters with 1.5 sigma separation and 20 pulses per emitter (i.e. the top graph is the ideal sum and the bottom graph are the individual terms).

As an example of utilizing the method of rank estimation with fixed emitters 24 and sensors 30, reference is made to FIG. 2A, which is a fixed, ideal distribution of three emitters 24 with 1.5 sigma 25 separation and 20 pulses per emitter 24 (i.e. the top graph is the ideal sum and the bottom graph are the individual terms). In this example, the three emitters 24 are located next to each other, where one emitter 24 is separated from the middle emitter 24 by 5 nautical miles, one emitter 24 is separated from the middle emitter 24 by 3 nautical miles and all three emitters 24 are 50 nautical miles from the DF system.

Figure 2B:
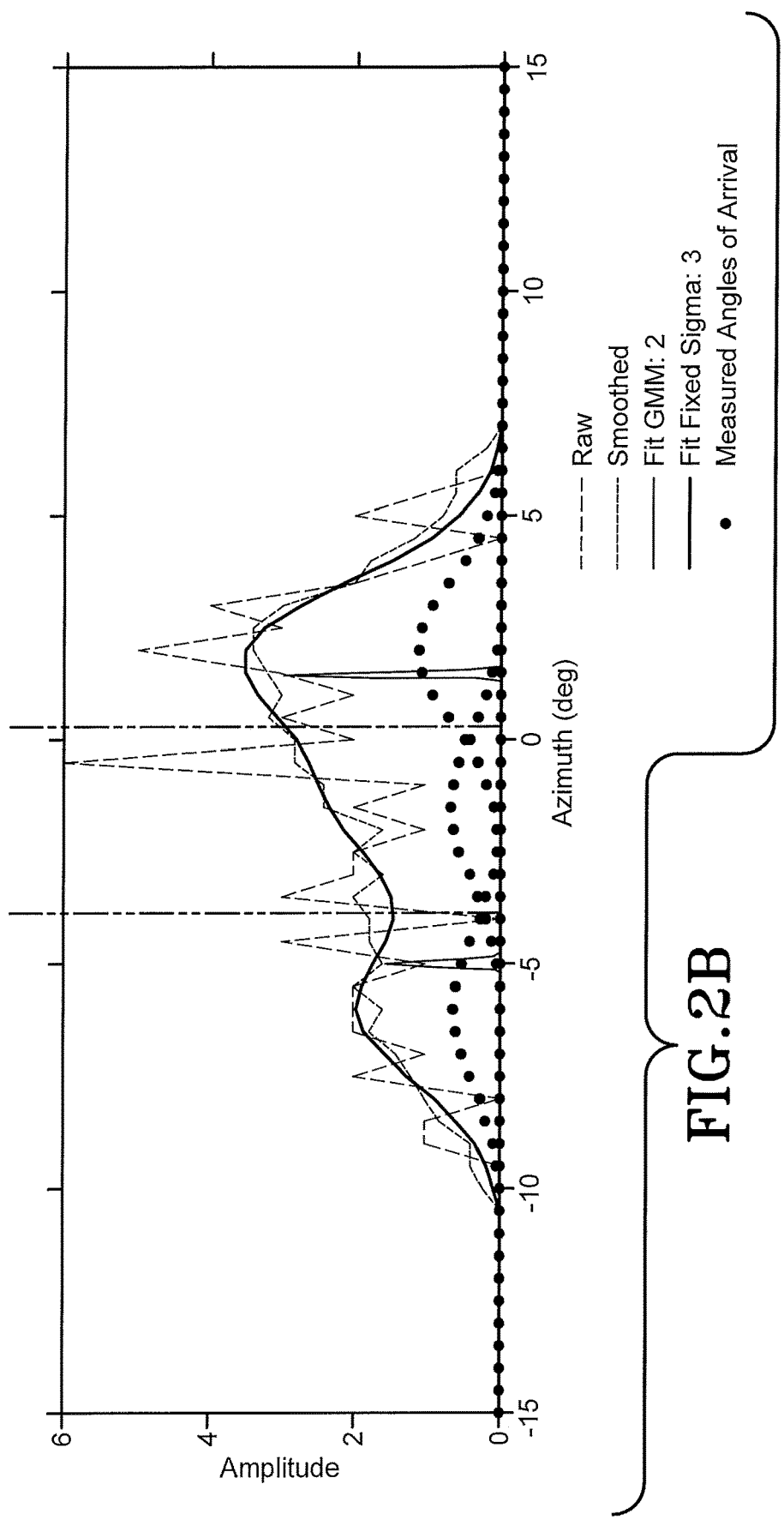
FIG. 2B is a limited sample histogram of three emitters with 1.5 sigma separation and 20 pulses per emitter.

FIG. 2B depicts a limited sample histogram of three emitters 24 with 1.5 sigma separation and 20 pulses per emitter 24. When the sigma separation is less than 2 (i.e. 2 sigma), it is difficult to sort the emitters 24. When a DF accuracy expectation is not imposed on the curve fit of the AoA 28 histogram, only two out three emitters 24 are predicted as depicted by the Fit GMM: 2 line (FIG. 2B). Without imposing a fixed sigma, the two emitters 24 are merged into one bell curve, and only a rank two out of three emitters 24 is predicted. When a constrained DF accuracy expectation is imposed on the curve fit of the AoA 28 histogram, all three emitters 24 are predicted as depicted by the Fit Fixed Sigma: 3 line (FIG. 2B). Although the FSGMM accurately predicted the number of emitters 24, the AoA 28 sorting is still crude because it is difficult to sort emitters 24 having a sigma separation of less than 2 sigma.

Figure 3A:
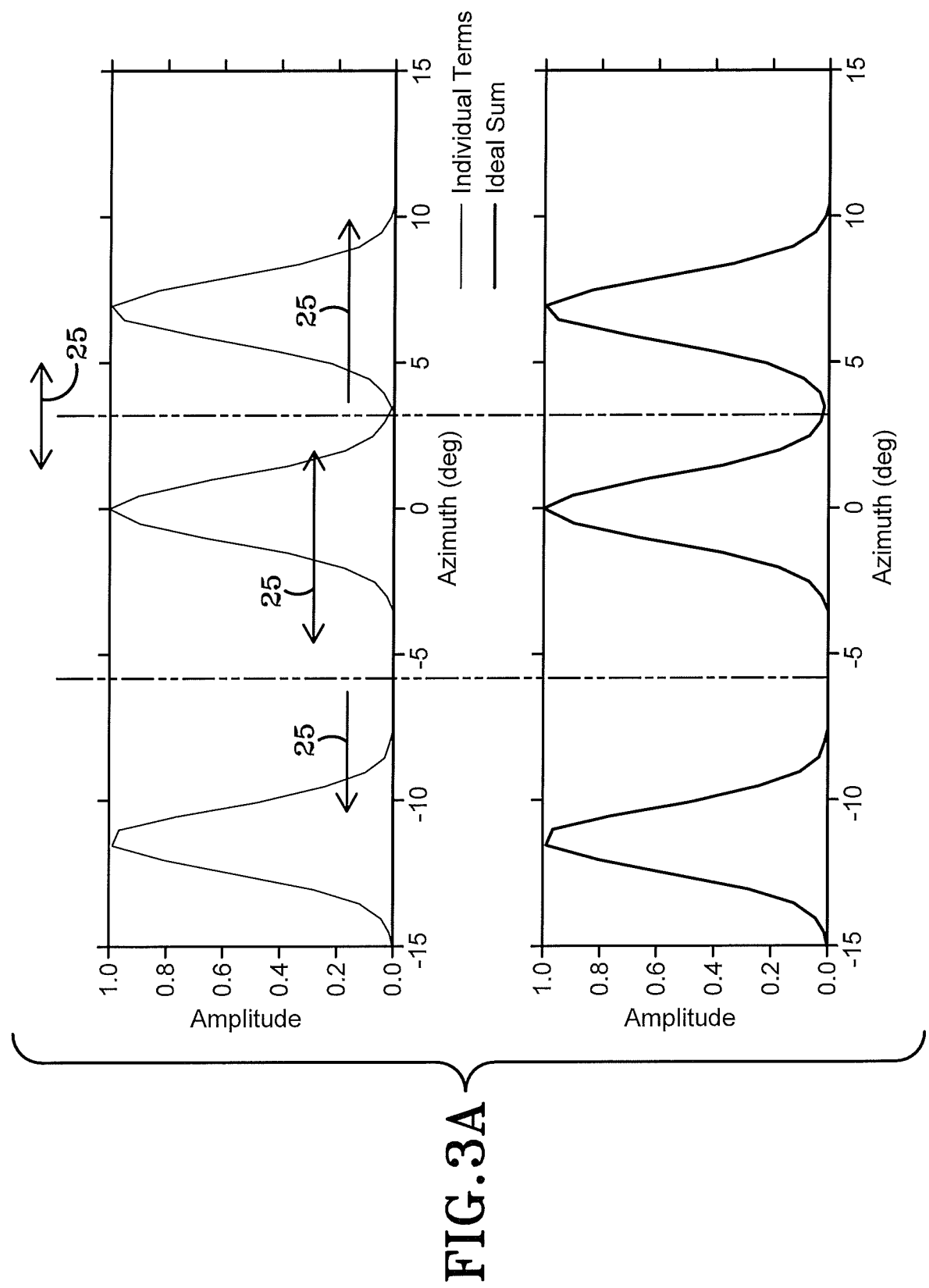
FIG. 3A is a graphical representation of a fixed, ideal distribution of three emitters with 1.5 sigma separation and 20 pulses per emitter (i.e. the top graph is the ideal sum and the bottom graph are the individual terms).

As another example of utilizing the method of rank estimation with fixed emitters 24 and sensors 30, reference is made to FIG. 3A, which is a fixed, ideal distribution of three emitters 24 with 3 sigma (reference numeral 25) separation and 20 pulses per emitter 24 (i.e. the top graph is the ideal sum and the bottom graph are the individual terms). In this example, the three emitters 24 are located next to each other, where one emitter 24 is separated from the middle emitter 24 by 5 nautical miles, one emitter 24 is separated from the middle emitter 24 by 3 nautical miles and all three emitters 24 are 25 nautical miles from the DF system.

Figure 3B:
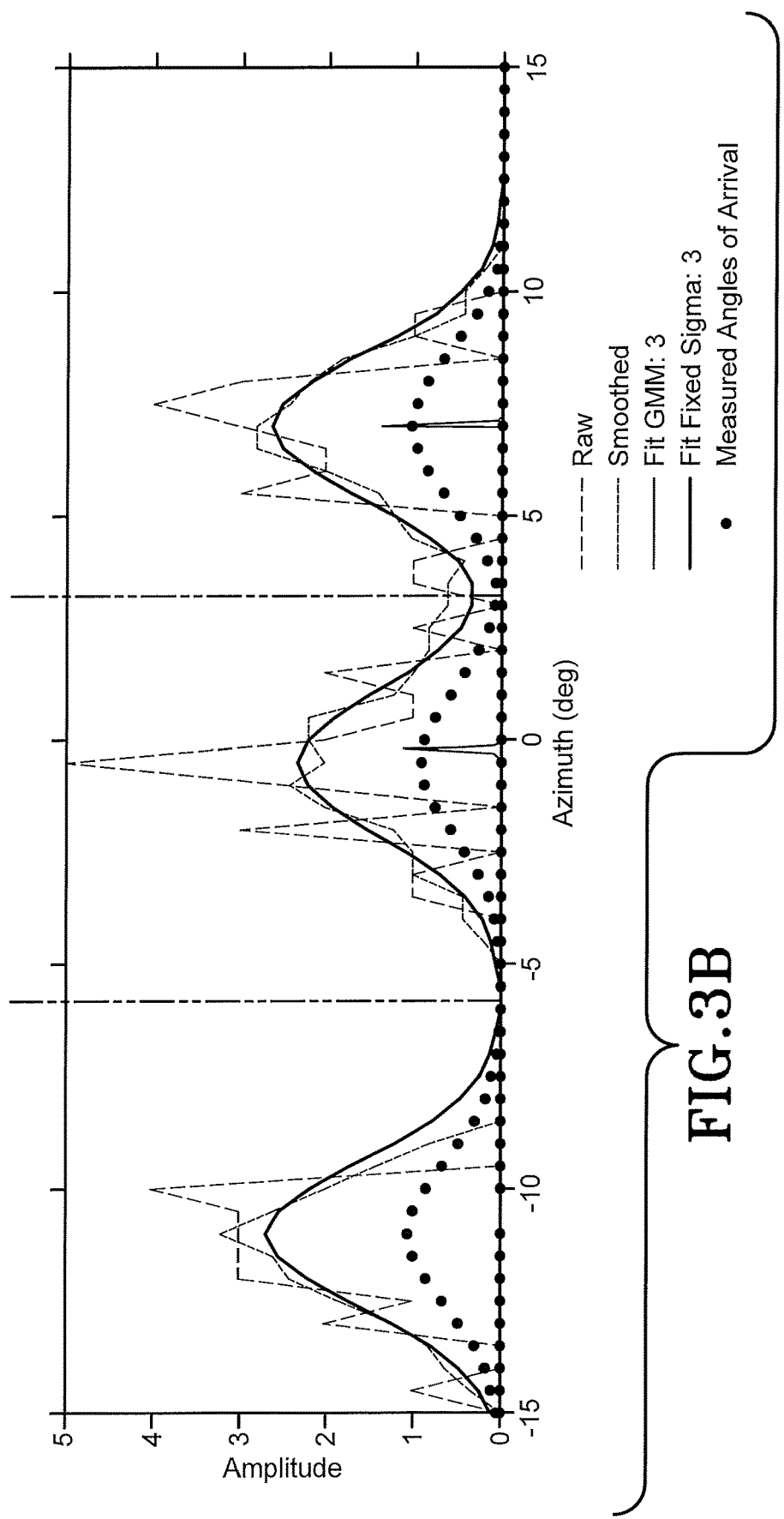
FIG. 3B is a limited sample histogram of three emitters with 3 sigma separation and 20 pulses per emitter.

FIG. 3B depicts a limited sample histogram of three emitters 24 with 3 sigma separation and 20 pulses per emitter 24. When the sigma separation is 3 sigma or greater (i.e. 3 sigma), the number of emitters 24 can be determine utilizing FSGMM and unconstrained Gaussian Mixture Model (GMM). Thus, all three emitters 24 are predicted by the GMM as depicted in the Fit GMM: 2 line (FIG. 3B) and the Fit Fixed Sigma: 3 line (FIG. 3B). Further, due to the sigma separation being 3 or greater, the AoA 28 sorting is accurate.

If the sensor 30 is in motion (e.g., a receiver on a UAV or airplane), the AoAs 28 measured at a previous time or location of the receiver need to be extrapolated to a single time or location of the sensor 30. That is, the motion of the sensor 30 needs to be removed from the AoA 28 measurement. This is accomplished by assuming that all emitters 24 are at the assumed same range, and by using the range and transverse motion of the sensor to compensate for the sensor motion, which adds an offset to the measured AoAs 28.

Figure 4B:
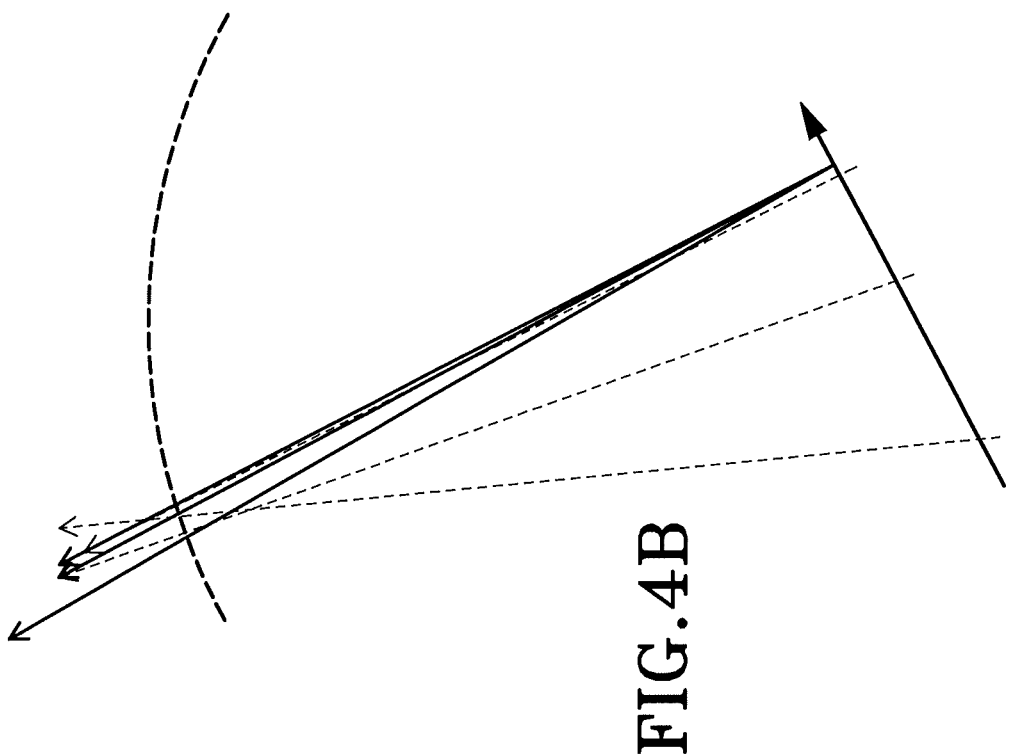
FIG. 4B is dashed lines representing AoAs that are not extrapolated and solid lines representing AoAs that are extrapolated.
Figure 4A:
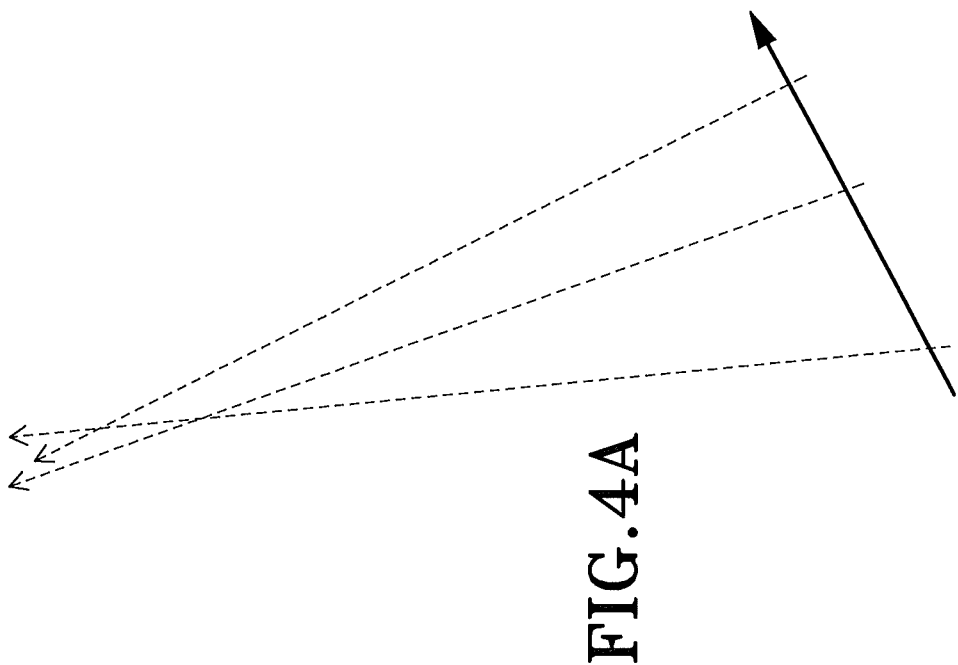
FIG. 4A is dashed lines representing AoAs that are not extrapolated.

As an example of the extrapolation described above, reference is made to FIG. 4A which is AoAs 28 that are not extrapolated (shown as dashed lines) and FIG. 4B which is dashed lines representing AoAs 28 that are not extrapolated and solid lines representing extrapolated AoA 28 angles. FIG. 4B assumes an arc or distance, depicted as a dark dashed line, from the emitters 24, and extrapolates the AoAs 28 based on the intersection of the AoAs 28 with the assumed arc. Since the arc must be assumed, the program may be run more than one time at different ranges (i.e. different assumed arcs) to determine an accurate assumed arc. Thus, the AoA 28 data is preconditioned to remove sensor 30 motion from the AoA 28 data. Although the sensor 30 motion is accounted for, the emitter 24 motion and range must be known. If two emitters 24 are at grossly different ranges, then the preconditioning of the AoA 28 data will not be accurate and the AoA 28 histogram will be blurred, which can cause the rank estimate to be too large.

This compensation for the AoAs 28 will not be exact if the emitters 24 are also moving, or if the emitters are at different ranges. Due to the possibility of situations which are not fully represented by the method of rank estimation utilizing FSGMM, the method of rank estimation utilizing FSGMM is intended to be used as a pre-filter and not as a final determination of rank.

The FSGMM program does not account for emitter 24 motion. The emitters 24 are assumed to move less than a DF sigma width over the duration of a time-gated window. If this assumption is not considered, the AoA 28 distribution will be artificially broadened and will falsely require two Gaussian curves to match the AoA 28 distribution. Emitters 24 that are in motion beyond ½ of a DF sigma accuracy in cross range will cause false Gaussian peaks. Thus, the time gate window when calling FSGMM is the shortest and most restrictive parameter.

Figure 5A:
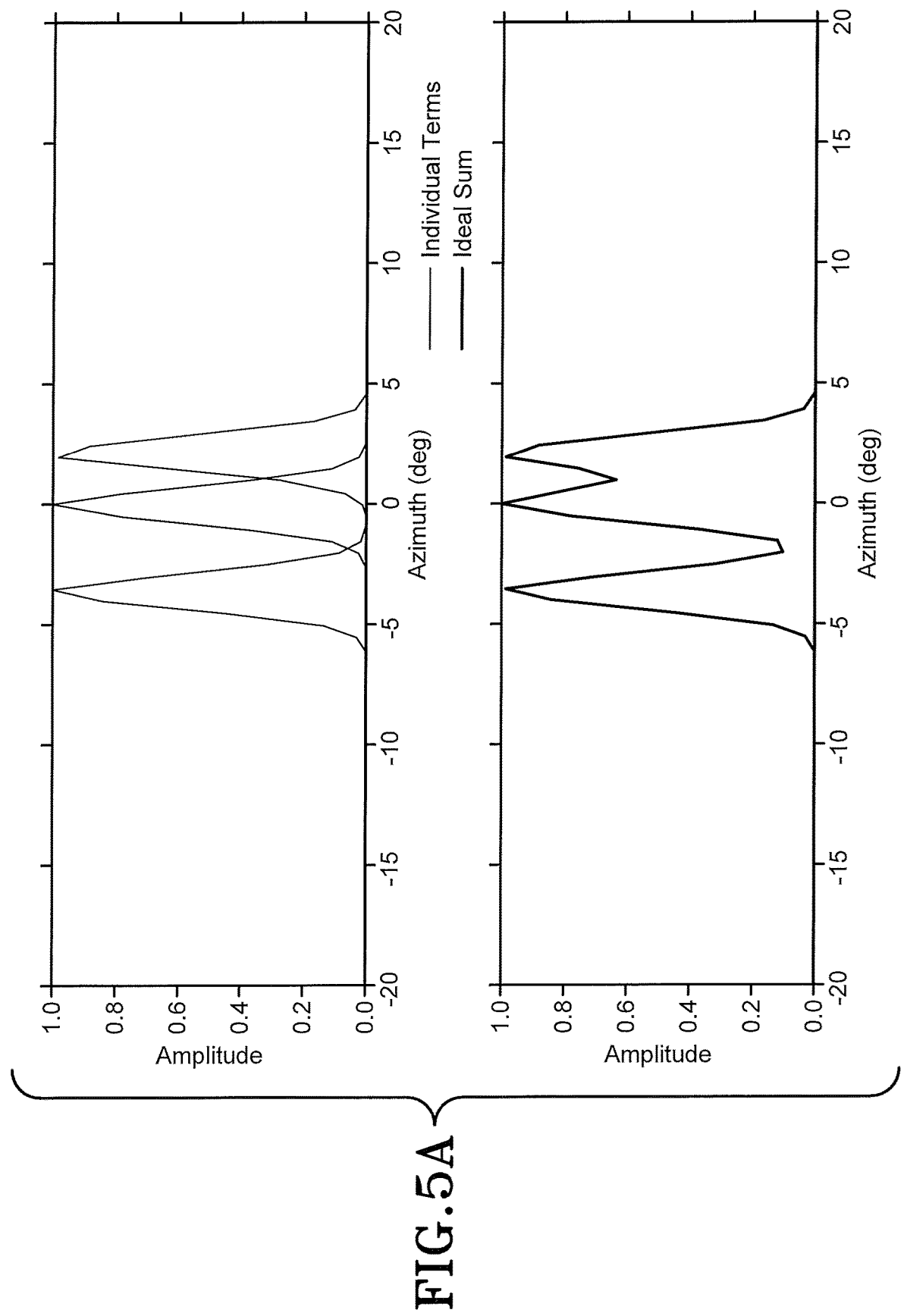
FIG. 5A is a graphical representation of a fixed, ideal distribution of three emitters (i.e. the top graph is the ideal sum and the bottom graph are the individual terms).
Figure 5B:
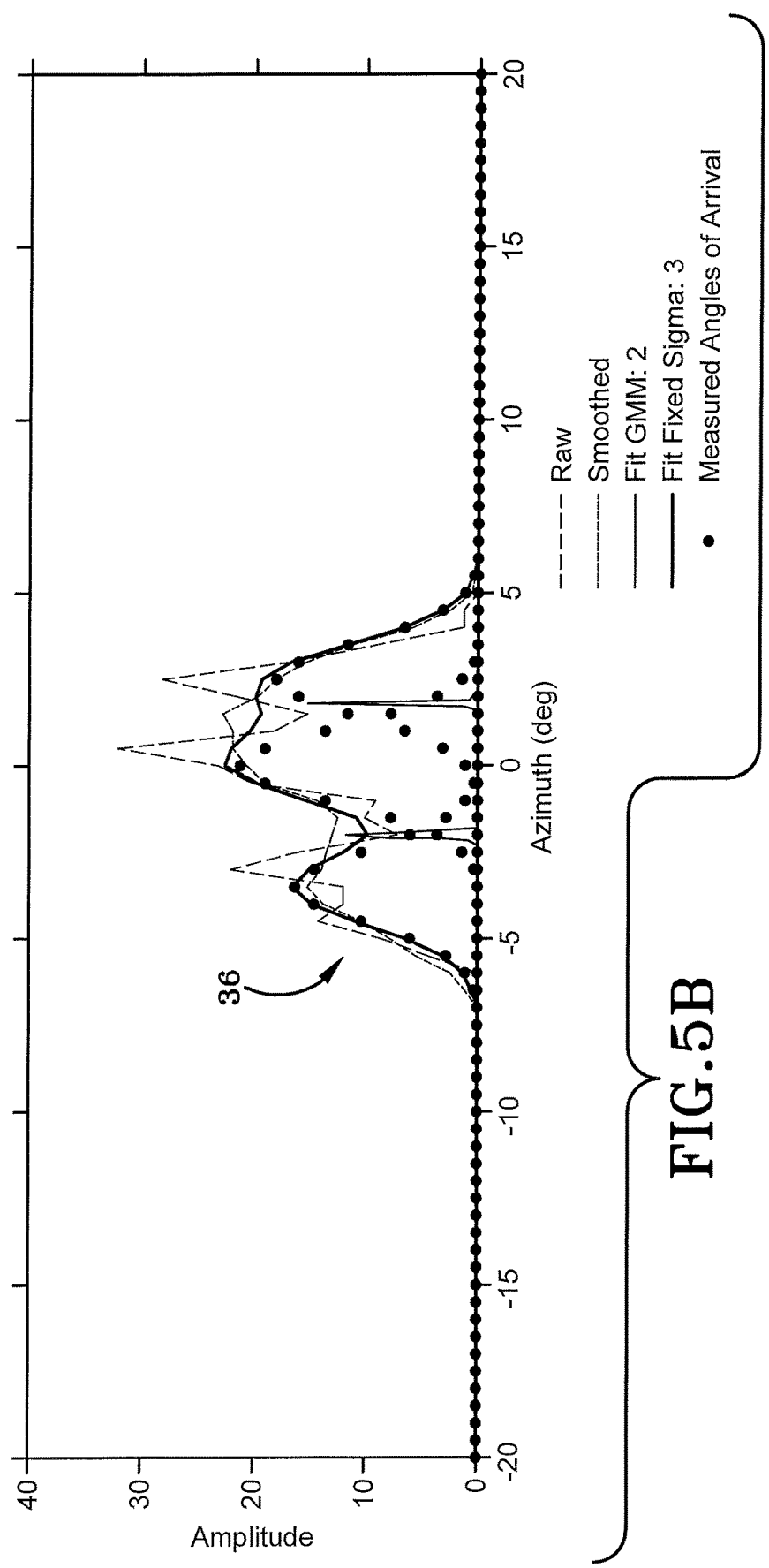
FIG. 5B is a graphical representation of an FSGMM fit to a simulated AoA histogram where the histogram is based on intersections of the measured AoAs with an assumed arc.

As an example of sensor 30 motion and/or emitter 24 motion affecting the FSGMM fit to the AoA 28 histogram, reference is made to FIG. 5A which is a fixed, ideal distribution of three emitters 24 (i.e. the top graph is the ideal sum and the bottom graph are the individual terms) and FIG. 5B which is an FSGMM fit to a simulated AoA 28 histogram where the histogram is based on intersections of the measured AoAs 28 with the assumed arc. As depicted in FIG. 5B, arrow 36 shows that the histogram can be blurred due to emitter 24 motion or by assuming an incorrect range.

One option to limit the effect of emitters 24 in motion is to limit the time span of the batched AoA 28 data so the emitters 24 only have enough time to move at most by ½ DF accuracy. Another option to limit the effect of emitters 24 in motion is to utilize various fixed cross range velocity emitter 24 values and offset the AoAs 28 by an appropriate amount as one of ordinary skill in the art would understand. The Gaussian solution with the least number of peaks is likely the correct solution.

According to one aspect of the present disclosure, when a sensor 30 is in motion (e.g. the sensor is on an aerial-based vehicle) the histogram for FSGMM analysis may be an AoA-uncertainty weighted AoA 28 distribution. The DF system reports the measured AoA 28 and the expected AoA 28 accuracy based on the accuracy of the DF system. This accuracy is a function of SNR, of attitude (i.e. role-pitch-yaw of an aerial-based vehicle), and of the magnitude of the correlation interferometry direction finding (CIDF) correlation. Smaller expected uncertainties in the AoA 28 measurement should provide a bigger amplitude addition to the azimuth bin in the histogram. According to one embodiment of the present disclosure, the histogram for FSGMM analysis can be a voltage-weighted AoA 28 distribution, using the preconditioned AoAs 28. A mean voltage is determined for the AoA 28 batch data sent to FSGMM, and the histogram amplitude has units of 'mean voltage.'

In accordance with one aspect of the present disclosure, the voltage weighting is $V_{current}/V_{mean}$. The method imposes an upper limit of $(V_{current}/V_{mean})_{upper}$, to not allow very high voltages from dominating the distribution. The method also imposes a lower limit of $(V_{current}/V_{mean})_{lower}$, to avoid neglecting very low voltage measurements. AoAs 28 with relatively small voltages, or powers, should be de-weighted because they are most likely from side or back lobes with different incident polarizations, which cause less accurate DF measurements. On the opposite extreme, AoAs 28 with very high voltages are most likely main lobes, however, the DF accuracy should not be significantly better than the nominal voltage AoA 28, assuming a typical detection signal of greater than 13 decibels SNR.

In accordance with one aspect of the disclosure, asymmetrical AoA 28 distributions may produce false tracks due to the asymmetry. Constraining the DF sigma separation helps in suppressing false tracks due to asymmetry. In general, to avoid asymmetric AoA 28 distributions, especially for a global analysis of the AoA 28 data in a global split logic, the code calls the FSGMM routine with all of the AoAs 28 that are within 3 sigma of each other. In the case of a group of emitters 24, the code calls the FSGMM routine with all of the history of AoAs 28 in a particular time gate for all of the emitter 24 KF tracks that are within 3 DF sigma of each other. Because neighboring emitter 24 tracks are included in creating the AoA 28 histogram, the hard associations of AoAs 28 to emitter 24 tracks are not pulling AoAs 28 out of the AoA 28 distribution at a hard cut-off angle between tracks which prevents causing asymmetry in the AoA 28 distribution. A local splitting logic only sends AoAs 28 from one emitter 24 track to the FSGMM batch process program creating a risk of hard cut-offs of the AoA 28 assignments which can create asymmetric Gaussian distributions and produce false higher ranks.

Reference is made to FIG. 6A which is a histogram with contributions from two emitters 24 and FIG. 6B which is histogram having asymmetric distribution as a result of hard assignments to individual AoA 28 tracks and only sending AoAs 28 from one track to the FSGMM program.

In accordance with one aspect of the disclosure, in order to curve fit the FSGMM to the histogram of AoAs 28 versus azimuth, the Gaussian coefficients must be calculated. For a given set of Gaussian directions (i.e. mean azimuths), the best coefficients for each Gaussian curve versus azimuth are calculated using the following equation:

$$(h_1 \quad h_2 \quad \ldots \quad h_{N_{az}})_{Gaus} = \qquad \text{(Equation 1)}$$

$$(C_1 \quad C_2 \quad \ldots \quad C_{N_{rank}}) \begin{pmatrix} G_{1,1} & G_{2,1} & \ldots & G_{N_{Az},1} \\ G_{1,2} & G_{2,2} & & G_{N_{Az},2} \\ \vdots & & & \\ G_{1,N_{rank}} & G_{2,N_{rank}} & & G_{N_{Az},N_{rank}} \end{pmatrix}$$

where h are the histogram amplitudes, G is the matrix of the Gaussian curves, and C is the matrix of the coefficients for the Gaussian curves. The dimension of h is 1 row by $N_{az}$ azimuth bins. The dimension of C is 1 row by the test number of Gaussian curves (e.g., typically <4) $N_{rank}$. The dimension of G is $N_{rank}$ rows by $N_{az}$ azimuth bins. Equation 1, in condensed notation, is as follows: [H(1×Naz)]meas= [C(1×Naz)] [G(Nrank×Naz)].

The goal is to minimize the difference between the histogram $h_{meas}$ and the Gaussian fit $h_{gaus}$ according to:

$$\min\left(\sum_{i_{az}=1}^{N_{az}} |h_{i_{az},meas} - h_{i_{az},gaus}|\right). \qquad \text{(Equation 2)}$$

Equation 2, in condensed notation is as follows: $[C(1 \times N_{rank})]=[H(1 \times N_{az})]_{meas} \text{inv}[G(N_{rank} \times N_{az})]$.

This minimization is accomplished when the histogram $h_{meas}$ equals the Gaussian fit $h_{gaus}$ according to:

$$(h_1 \quad h_2 \quad \ldots \quad h_{N_{az}})_{Meas} = \qquad \text{(Equation 3)}$$

$$(h_1 \quad h_2 \quad \ldots \quad h_{N_{az}})_{Gaus} = (C_1 \quad C_2 \quad \ldots \quad C_{N_{rank}})$$

$$\begin{pmatrix} G_{1,1} & G_{2,1} & \ldots & G_{N_{Az},1} \\ G_{1,2} & G_{2,2} & & G_{N_{Az},2} \\ \vdots & & & \\ G_{1,N_{rank}} & G_{2,N_{rank}} & & G_{N_{Az},N_{rank}} \end{pmatrix}.$$

Next, the method calculates normalized Gaussian curves for each mean, utilizing a fixed sigma. Then, the method forms a normalized Gaussian $n_{xm}$ matrix $G(n_{xm})$. Next the method takes the pseudo inverse of G, and solves for coefficients C. The coefficients are given by multiplying both sides by the pseudo inverse of the matrix G according to:

$$(C_1 \quad C_2 \quad \ldots \quad C_{N_{rank}}) = (h_1 \quad h_2 \quad \ldots \quad h_{N_{az}})_{Meas} * inv \qquad \text{(Equation 4)}$$

-continued $$\begin{pmatrix} G_{1,1} & G_{2,1} & \cdots & G_{N_{Az},1} \\ G_{1,2} & G_{2,2} & & G_{N_{Az},2} \\ \vdots & & & \\ G_{1,N_{rank}} & G_{2,N_{rank}} & & G_{N_{Az},N_{rank}} \end{pmatrix}$$

The typical $N_{rank}$ will be 1, 2 or 3 and the typical $N_{az}$ will be approximately 20 to 50 azimuth bins.

An alternative to performing the matrix pseudo-inverse calculation described above is to manually test all combinations of a discrete set of coefficients. However, the calculation time is much longer when manually testing all combinations of a discrete set of coefficients.

In accordance with one aspect of the present disclosure, the input data for the FSGMM program includes an L×M azimuth search window and a voltage-weighted AoA 28 histogram. The outer loop of the program is 'for loop: n rank hypothesis', which determines the hypothesized number of emitters 24 starting with 1, then 2, then 3, etc. The inner loop of the program is 'for loop: Gaussian means for current $p_{rank}$,' which tests all Gaussian means of the bell curve for the particular rank. In other words, the method tests all variations of Gaussian means, for the given rank hypothesis, over the given azimuth search window. The azimuth means must be separated by N DF sigma. Next, the method estimates the best coefficients of C according to Equation 4 above. Next, the method calculates the sum of the residuals for the particular set of azimuth means, based on the coefficients C. If the residuals are less than the residuals for the stored azimuth means, then the method replaces the stored azimuth means with new values. The program ends with a 'means loop' and an '$n_{rank}$ hypothesis loop.'

The theoretical Gaussian curve fit at each azimuth is derived according to:

$$G_{ibin,iG}[\theta_{ibin} - \theta_{iG}] = \frac{1}{\sigma\sqrt{2\pi}} \exp\left(-\frac{1}{2}\frac{(\theta_{ibin} - \theta_{iG})^2}{\sigma^2}\right). \quad \text{(Equation 5)}$$

In practice, the test Gaussian histogram is normalized by the mean of the Gaussian histogram, and therefore, the typical magnitude of the Gaussian histogram is 1. The measured histogram is normalized by the mean of the measured histogram, and, therefore, the typical magnitude is also 1. Then, the coefficients for each Gaussian mixed curve are calculated using Equation 4.

The method includes an error metric for the FSGMM histogram fit to the voltage-weighted AoA 28 histogram. The error metric utilizes the residual sum of squares (RSS) which is the sum of the squares of the residuals (i.e. the deviations predicted from actual empirical values). The RSS is a measure of the discrepancy between the measured data and the estimation model of the present disclosure. Further, the RSS is utilized as an optimality criterion in parameter selection and estimation model selection. A small RSS indicates a tight fit of the estimation model to the measured data and a large RSS indicates a loose fit of the estimation model to the measured data which is further described below.

The measured sum of residuals is calculated according to:

$$(\Delta A_{sum}^{measured})^2 = \sum_{ibin} \left| \langle V \rangle n_{ibin} - \sum_{iG} G_{ibin,iG} \right|^2 = \sum_{ibin} |\Delta A_{bin}|^2 \quad \text{(Equation 6)}$$

where 'A' is the amplitude of the voltage-weighted AoA 28 histogram at each azimuth bin, '<V>' is the average voltage of each AoA 28 measurement, 'G' is the sum of the Gaussian curves at each azimuth bin, '$n_{ibin}$' is the number of AoAs 28 assigned to each azimuth bin and 'iG' is the index of the Gaussian curve. The measured sum of residuals indicates whether the Gaussian curves adequately predict the voltage-weighted AoA 28 histogram.

The expectation for measurement noise for the voltage-weighted AoA 28 histogram is based on random walk arguments. The expected residual is determined per azimuth bin, and all of the expected residuals are root-summed-squared to get the sum of the residuals.

In order to derive the theoretical sum of residuals, the method obtains the expected residual per bin per Gaussian curve. Each azimuth bin should have an expected height residual with a sigma equal to the square root of the height of the bin. The method assumes a nominal voltage contribution to the distribution. The method neglects the variations between the voltage weights. For each Gaussian curve, the distribution height sigma per Gaussian curve is the nominal Gaussian amplitude divided by the square root of the number of AoAs 28 contributing to the height. The expected residual per bin per Gaussian curve is derived according to:

$$(\Delta A)_{ibin,iG} = \frac{G_{iG}}{\sqrt{n_{ibin,iG}}} = \frac{n_{ibin,iG}\langle V \rangle}{\sqrt{n_{ibin,iG}}} = \sqrt{n_{ibin,iG}}\langle V \rangle. \quad \text{(Equation 7)}$$

By definition, the root-summed-square of the residuals per bin, summing over all Gaussians, is the following:

$$(\Delta A)_{ibin} = \sqrt{\sum_{iG} (\Delta A)_{ibin,iG}^2}. \quad \text{(Equation 8)}$$

Equation 8 is expanded by substitution according to:

$$(\Delta A)_{ibin}^{theory} = \sqrt{\sum_{iG} \left(\sqrt{n_{ibin,iG}}\langle V \rangle\right)^2} = \langle V \rangle \sqrt{\sum_{iG} n_{ibin,iG}} = \langle V \rangle \sqrt{n_{ibin}}. \quad \text{(Equation 9)}$$

The nominal voltage is removed from the summation, and the $_{ibin,iG}$ simplifies to the square root of the total $n_{ibin}$, independent of the number of Gaussians, at each azimuth bin.

The root-sum-square of all of the residuals of all of the azimuth bins is calculated according to:

$$(\Delta A_{sum}^{theory})^2 = \sum_{ibin} \left((\Delta A)_{ibin}^{theory}\right)^2 = \langle V \rangle^2 \sum_{ibin} n_{ibin} = \langle V \rangle^2 N_{total}. \quad \text{(Equation 10)}$$

Performing substitution, the root-sum-square of the square root of the $n_{ibin}$s is the square root of $N_{total}$.

At the true emitter 24 hypothesis (number of Gaussians), the ratio of the calculated residual should be close to 1. The measured sum of the residuals should be within the following:

$$\Delta A_{sum}^{measured} \leq \Delta A_{sum}^{theory} \quad \text{(Equation 11)}.$$

The method down-selects the rank hypothesis that is the lowest rank to achieve the approximate equality between the measured sum of the residuals and the expected sum of the residuals in accordance with the following:

$$\frac{\text{Measured Residual}}{\text{Theoretical Residual}} = \frac{\sum_{ibin} |\Delta A_{bin}|^2}{\langle V \rangle^2 N} \leq 1. \quad \text{(Equation 12)}$$

If the ratio is greater than an established upper limit (UL) above one, then the rank is too low. If the ratio is less than an established lower limit (LL) below 1, then the rank is too high. In accordance with one aspect of the present disclosure, the fixed sigma value needs to be 20% larger than the expected sigma in order to avoid incorrectly predicting higher ranks.

Figure 7A:
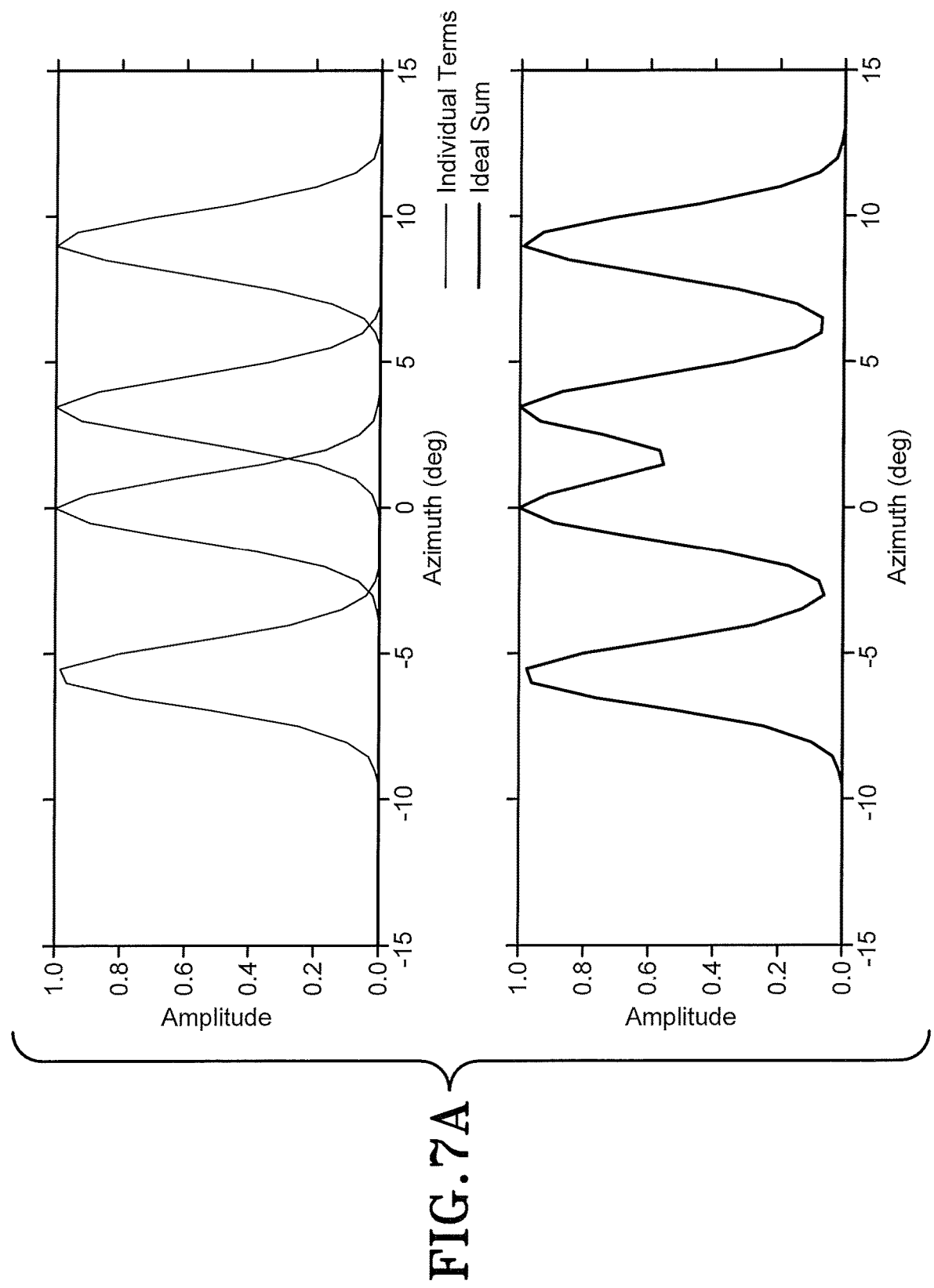
FIG. 7A is a graphical representation of an ideal distribution of 4 true emitters (top graph) and limited samples for an AoA histogram where the pulses per emitter are 100 (bottom graph).
Figure 7B:
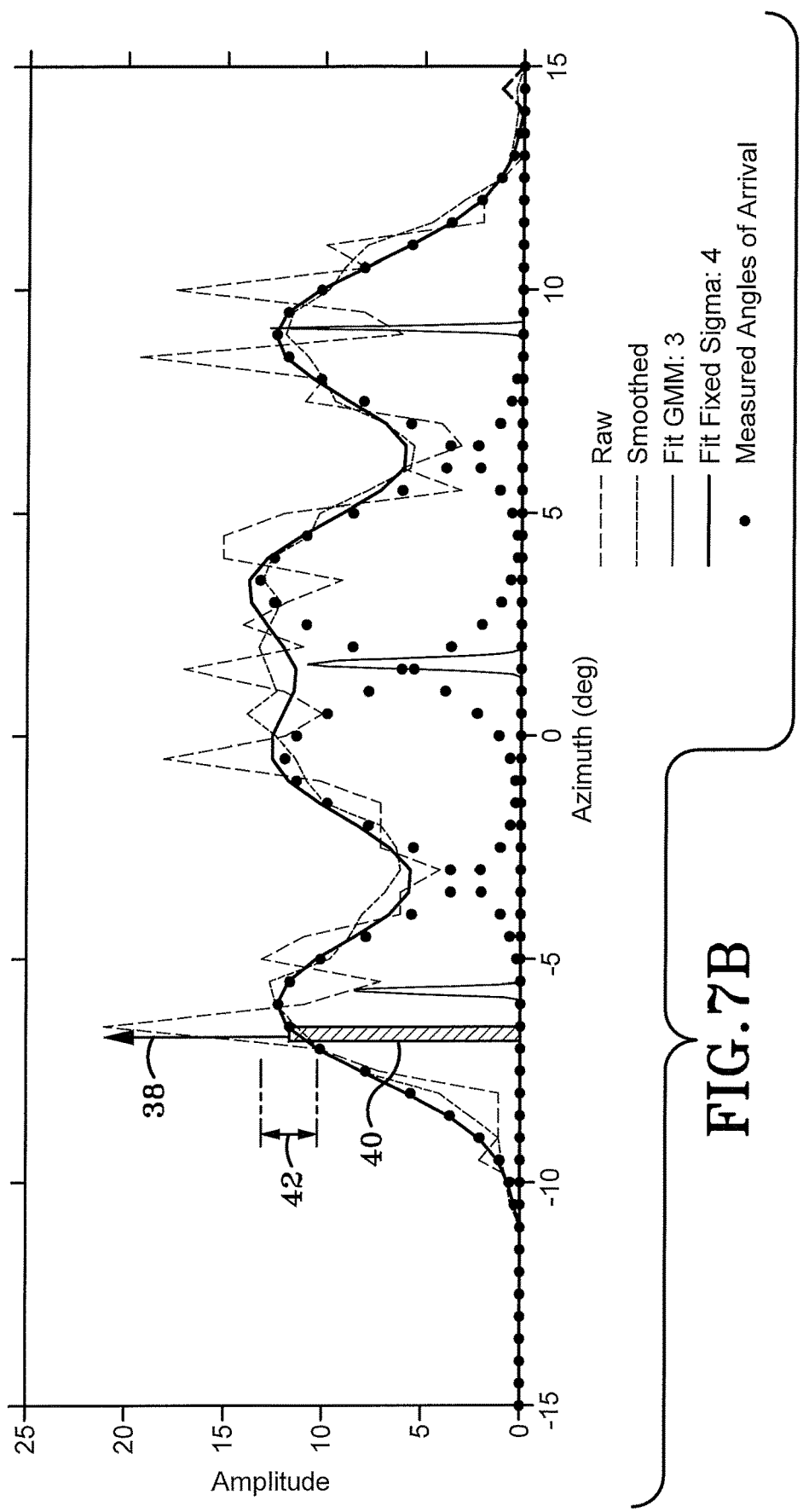
FIG. 7B is a graphical representation of an FSGMM fit to the limited samples of the bottom graph of FIG. 7A.

Reference is made to FIG. 7A which is an ideal distribution of four true emitters 24 (top graph) and limited samples for an AoA 28 histogram where the pulses per emitter 24 are 100 (bottom graph). FIG. 7B is an FSGMM fit to the limited samples of the bottom graph of FIG. 7A. The graph in FIG. 7B shows a measured error for one bin 38 and a measured bar for one bin 40 which are used to determine the error metric 42 as described above.

In accordance with one aspect of the disclosure, there are two ways to check the accuracy of the FSGMM before reporting the means/rank prediction. The first accuracy check accommodates different DF system sigma per AoA 28 measurement by calculating a hard score and a soft score fit to the AoA 28 distribution for the final prediction. Calculating the soft score will aid in avoiding over-estimating the number of emitters 24. The soft score is calculated using different AoA 28 accuracies per AoA 28 measurement. If the soft score of the rank below the chosen rank is within 4% of the chosen rank, then the rank is reduced to the lower rank. Soft scores have the beneficial feature of having the score-versus-rank saturate at the rank of the true number of emitters 24. Hard scores continually increase versus rank beyond true rank due to AoA 28 assignments restricted to much less than a sigma cutoff. Another advantage of using the score-versus-rank is that the individual AoA 28 uncertainties can be used for each AoA 28 measurement, instead of using an average uncertainty (i.e. sigma).

The hard assignment score is calculated as follows:

$$\text{Score}(N_{rank}) = \sum_{i_{emitter}}^{N_{rank}} \sum_{i_{AoA}}^{n_{AoA\_per\_emit}} \left[ n_{sigma\_cutoff}^2 - \left( \frac{\Delta \theta_{i_{emitter}, i_{AoA}}}{\sigma_{AoA}} \right)^2 \right]. \quad \text{(Equation 13)}$$

The method performs hard AoA 28 associations to emitters 24 utilizing the AoAs 28 assigned to each of the Gaussian curves for the hypothesized rank. If the delta$_{AoA}$/sigma is greater than $n_{sigma\_cutoff}$ (e.g. 3), then that AoA 28 is not used as part of the summation because the AoA 28 is too far away to be considered as part of that Gaussian curve. The maximum unphysical score is when the delta AoAs 28 are zero which indicates a perfect AoA 28 agreement with the hypothesized rank and AoAs 28 of the emitters 24 as calculated by:

$$\text{Score\_norm}(N_{rank}) = \frac{\text{Score}(N_{rank})}{N_{AoAs} n_{sigma\_cutoff}^2}. \quad \text{(Equation 14)}$$

A higher score is better, within expectations for ideal AoA 28 sigma. Generally, the scores get higher when assuming more emitter 24 curves to fit the AoA 28 data. However, the score needs to get stastically higher, above established thresholds, to be statistically valid.

Figure 8:
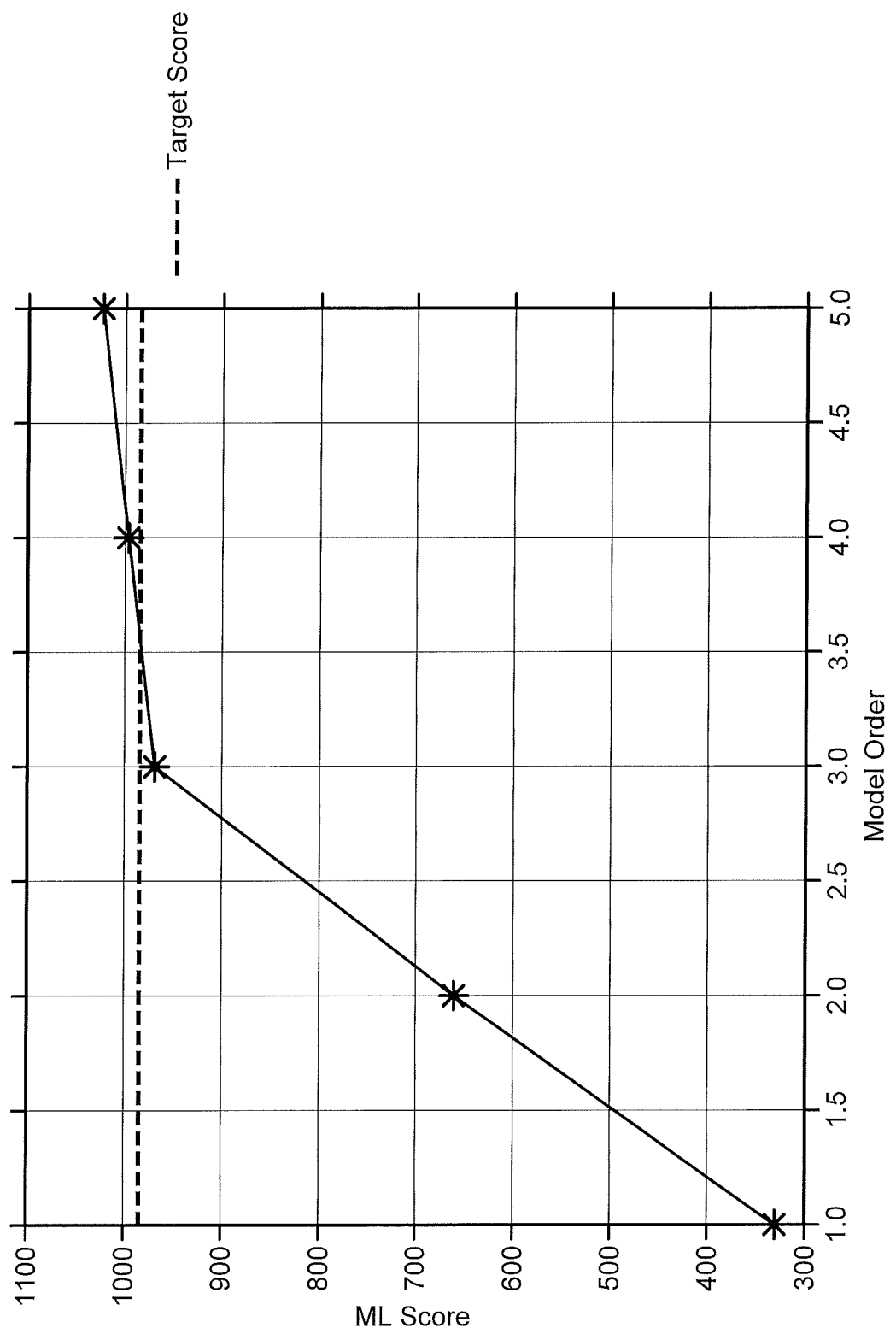
FIG. 8 is a graphical representation of score metric versus hypothesized rank.

Reference is made to FIG. 8, which is an example of score metric versus hypothesized rank. The ML score is calculated according to:

$$MLScore = \sum_{i=1}^{N} \max\left( N_{cutoff}^2 - \frac{\Delta_{AOAi}^2}{\sigma_i^2}, 0 \right). \quad \text{(Equation 15)}$$

The threshold for statistical credibility of the rank is determined by the ratio of $(N_{cutoff}^2 - 1)/N_{cutoff}^2$. If $N_{cutoff}$ is 3, then the threshold for acceptance of the rank estimate is 8/9 (i.e. 89%) of the maximum score of $N_{AoAs}*N_{cutoff}^2$. The method selects the first rank where all emitters 24 in that set of emitters 24 have individual scores that meet expectations.

Figure 9:
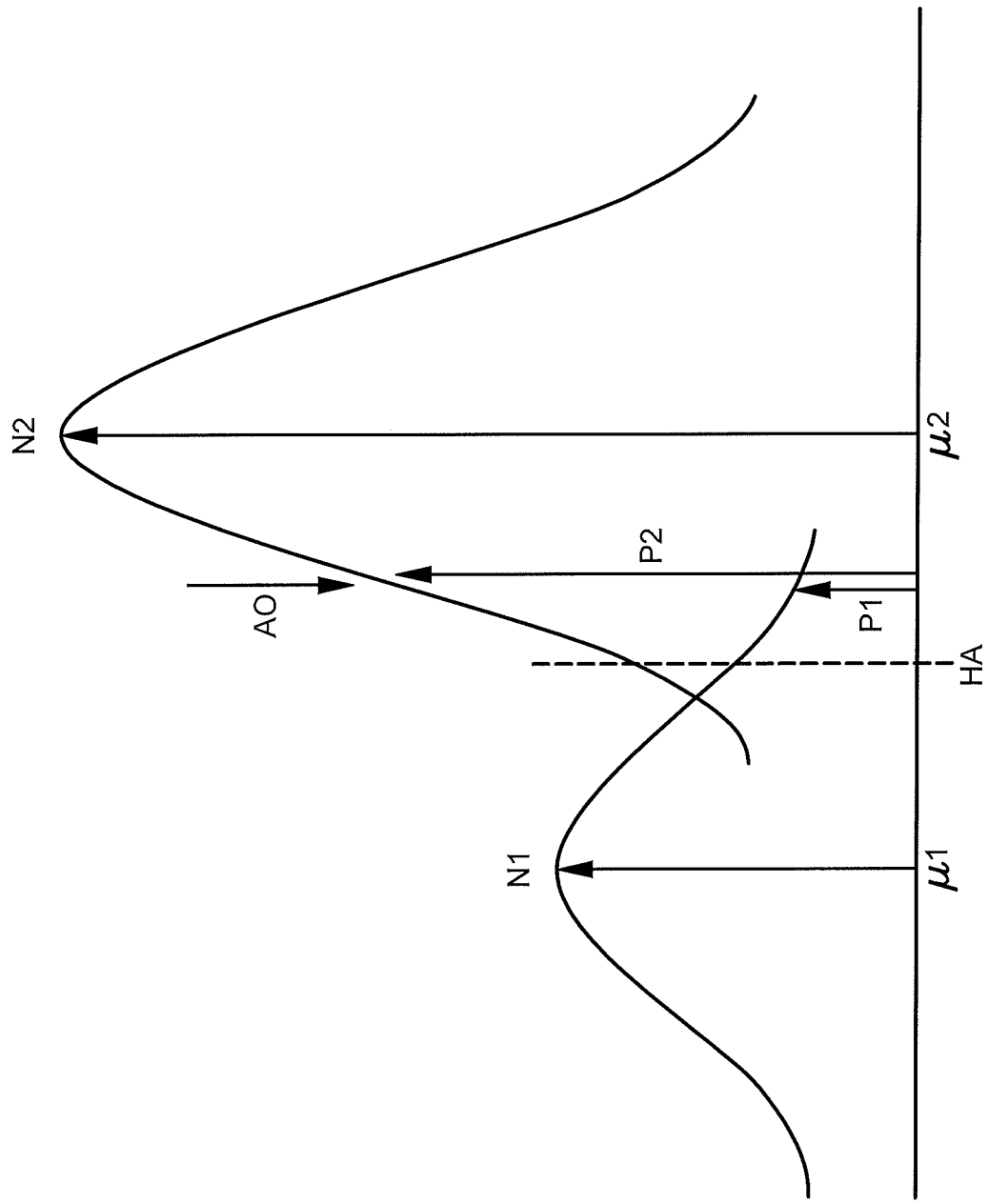
FIG. 9 is a graphical representation showing the probabilities, $P_1$ and $P_2$, that a particular AoA is associated with the first or second Gaussian curve of the graph.

The soft score assignment is the sum of $n_{cutoff\_sigma}^2$-Prob(delta$_{AoA}$)*(delta$_{AoA}$/sigma)^2. The method performs soft AoA 28 associations to emitters 24 utilizing the AoAs 28 assigned to multiple Gaussian curves, for curves with a mean within the $n_{cutoff\_sigma}$ offset from the AoA 28, for the hypothesized rank. Reference is made to FIG. 9 which shows the probabilities, $P_1$ and $P_2$, that a particular AoA 28 is associated with the first or second Gaussian curve. FIG. 9 also shows the hard association boundary point as HA. Rather than associate AoA 28 with Gaussian curve two, the AoA 28 is soft-associated with each of the Gaussian curves using the weight according to:

$$wgt_i = \frac{N_i P_i}{\sum_{k=1}^{N} N_i P_i} \quad \text{(Equation 16)}$$

and according to:

$$N_i = \text{count}(|x - \mu_i| < \sigma) - (x - \mu_i)^2. \quad \text{(Equation 17)}$$

The second accuracy check is utilized if only one KF track exists. If only one KF track exists, the method relaxes the DF sigma. If there is only 1 KF (e.g. 1 track) in a group of tracks, then the constrained FSGMM code result can be corroborated using the generic un-constrained GMM code. There is no need to impose greater DF accuracy separations with one emitter 24, and the method allows the Gaussian curve fitting to have a sigma of an LL to a UL times the presumed DF accuracy. A 1 DF sigma separation is imposed for any >1 rank solution.

In accordance with one aspect of the present disclosure, a common problem is determining the number of clusters in a mixed set of data having various statistical distributions where the FSGMM could not be utilized. In order to determine the number of clusters in a mixed set of data having various statistical distributions, the data may be clustered under the assumption that the data may be represented by a GMM, which is formed by combining multivariate normal density components.

For unconstrained GMM, the measured data is fitted to the GMM utilizing an expectation-maximization (EM) program, which assigns posterior probabilities to each component (i.e. cluster) density with respect to each observation. The fitting method utilizes an iterative program that converges to a local optimum. The posterior probabilities for each point indicate that each data point has a probability of belonging to a cluster fitted to the GMM. The data points are assigned by selecting a component that maximizes the posterior probability of each data point. A histogram along the x-axis may provide information about how statistical data is distributed based on available AoA 28 measurements.

Figure 10:
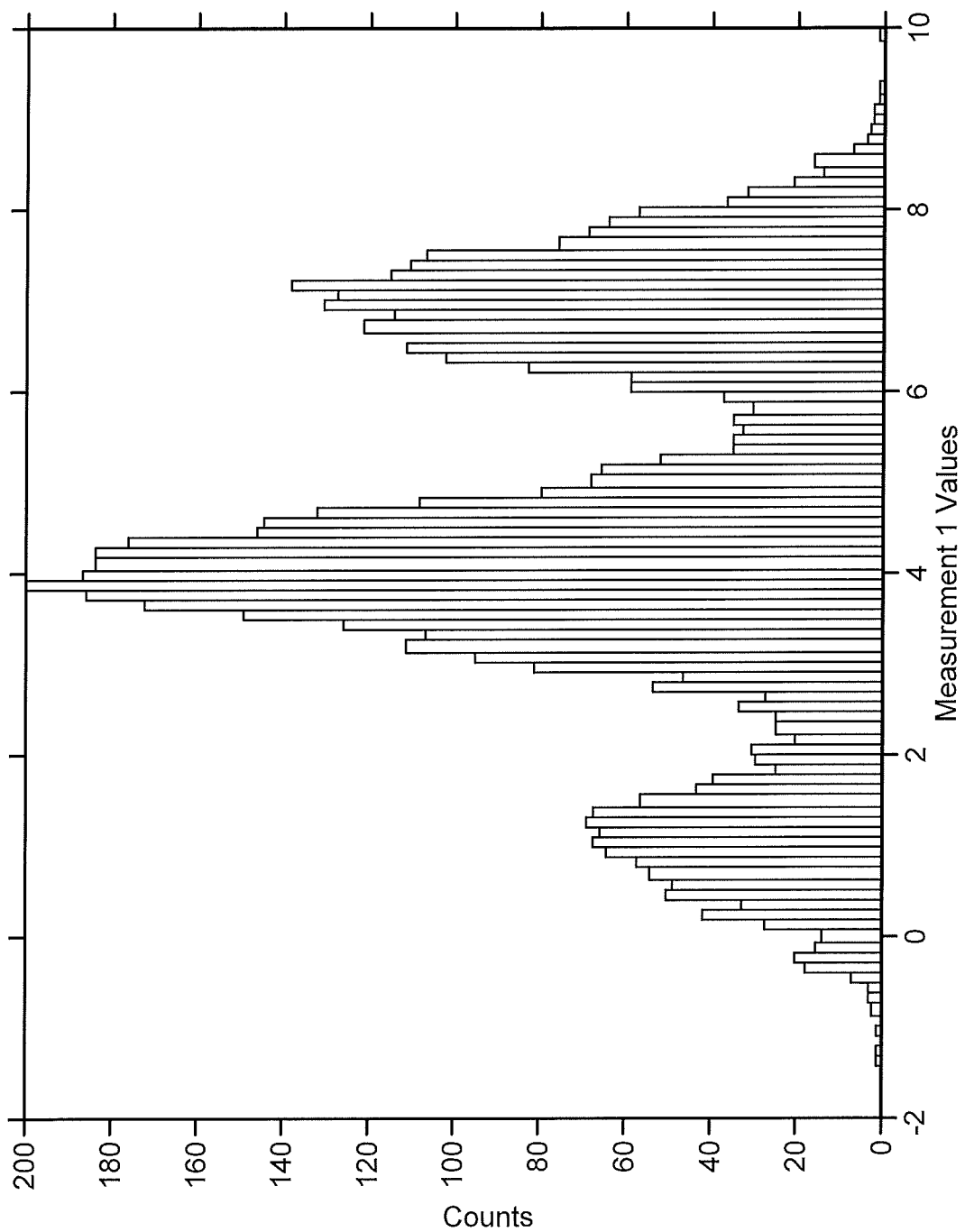
FIG. 10 is a graphical representation of cluster analysis utilizing unconstrained GMM.

Reference is made to FIG. 10, which is an example of cluster analysis utilizing unconstrained GMM. The rank (i.e. number of clusters) may be inferred by utilizing unconstrained GMM-based clustering to analyze measured data. For example, an initial estimation of clusters is provided and the clustering method is iteratively applied. The optimal solution (i.e. number of clusters and associated statistics) is determined when the Akaike information criterion (AIC) is minimized as a function of rank. AIC is a measure of the relative quality of statistical models for a given set of data. Given a collection of models for the data, AIC estimates the quality of each model, relative to each of the other models. Therefore, AIC provides a means for model selection. Further, AIC offers a relative estimate of the information lost when a given model is used to represent the process that generates the data. Thus, AIC is concerned with the trade-off between the goodness of fit of the model and the complexity of the model. The GMM program predicts how many clusters exist utilizing the measured data (only one dimension is observable), the mean of the clusters and what percentage (i.e. mixing proportion) of the measured data has been assigned to each cluster.

Figure 11:
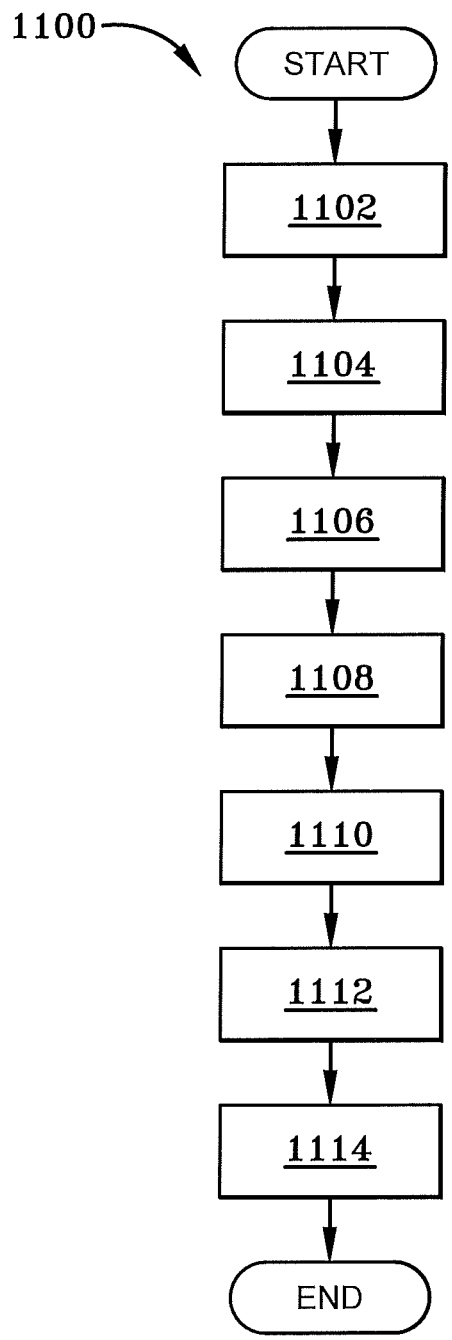
FIG. 11 is a flow chart depicting an exemplary method for ranking estimation.

In accordance with one aspect of the disclosure, reference is made to a ranking estimation method depicted in the flowchart of FIG. 11. The ranking estimation method 1100 first measures AoAs 28 from at least one electromagnetic emitter 24, which is shown generally at 1102. The accuracy of the measured AoAs 28 is established, which is shown generally at 1104. Tracks are assigned to the AoAs 28, which is shown generally at 1106. A histogram of the AoAs 28 versus azimuth is created, which is shown generally at 1108. The FSGMM is fitted to the AoA 28 histogram, which is shown generally at 1110. A rank estimation of the at least one electromagnetic emitter 24 is determined, which is shown generally at 1112. The track associated with the at least one electromagnetic emitter 24 is reported, which is shown generally at 1114.

Figure 12:
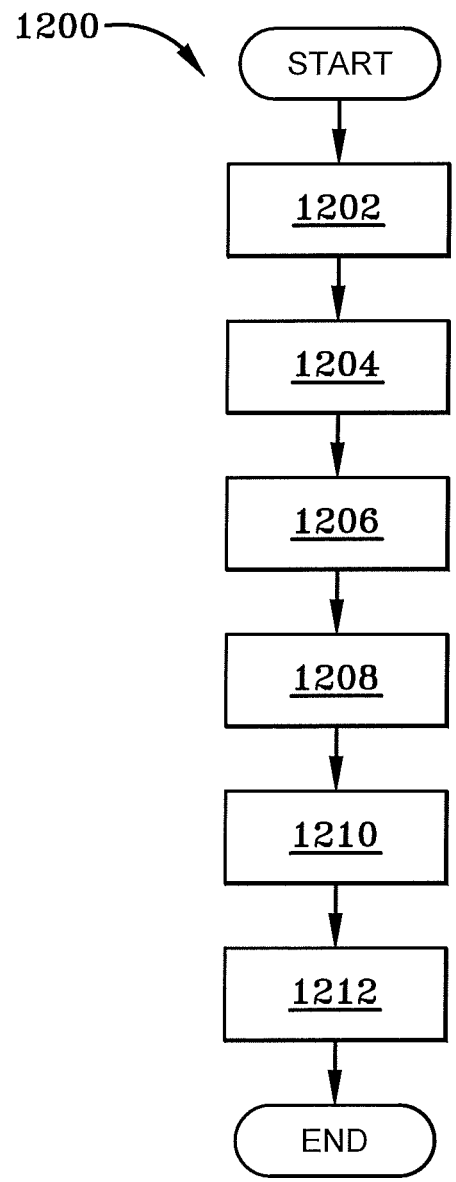
FIG. 12 is a flow chart depicting an exemplary method for ranking estimation.

In accordance with one aspect of the present disclosure, reference is made to a ranking estimation method depicted in the flowchart of FIG. 12. The ranking estimation method 1200 first measures AoAs 28 from at least one electromagnetic emitter 24, which is shown generally at 1202. A bar graph of the measured AoAs 28 is created, where a y-axis of the bar graph is the number of AoAs 28 (counts) and an x-axis of the bar graph is measurement values, which is shown generally at 1204. An initial estimated number of clusters is provided, which is shown generally at 1206. GMM clustering is applied to the measured AoAs 28 in an iterative manner, which is shown generally at 1208. An optimal solution is determined, which is shown generally at 1210. The optimal solution is reported, which is shown generally at 1212.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A method for rank estimation of electromagnetic emitters comprising:
measuring Angles of Arrival (AoAs) from a plurality of signals emitted from at least one electromagnetic emitter received at a detection system;
providing an estimated accuracy of the AoAs by the detection system;
providing an assigned track to one or more of the AoAs;
creating a histogram of the AoAs versus azimuth using the estimated accuracy of the AoAs and the assigned track of the AoAs;
determining a rank estimation of at least one predicted electromagnetic emitter by fitting a Fixed Sigma Gaussian Mixture Model (FSGMM) to the histogram; and
reporting the rank estimation associated with the at least one predicted electromagnetic emitter.

2. The method for rank estimation of electromagnetic emitters of claim 1, wherein fitting the FSGMM to the histogram is accomplished by utilizing at least one Gaussian curve having a fixed sigma to fit the histogram.

3. The method for rank estimation of electromagnetic emitters of claim 1, wherein the histogram is a voltage-weighted histogram.

4. The method for rank estimation of electromagnetic emitters of claim 3, wherein the voltage-weighted histogram is created based on voltage weighting of the AoAs where the voltage weighting is $V_{current}/V_{mean}$.

5. The method for rank estimation of electromagnetic emitters of claim 4, further comprising:
imposing an upper limit $((V_{current}/V_{mean})_{upper})$ and a lower limit $((V_{current}/V_{mean})_{lower})$ on the voltage-weighted histogram.

6. The method for rank estimation of electromagnetic emitters of claim 3, further comprising:
computing an error metric for the FSGMM fit to the voltage-weighted histogram.

7. The method for rank estimation of electromagnetic emitters of claim 1, further comprising:
calculating a theoretical sum of residuals;
calculating a measured sum of residuals;
determining a rank selection metric by comparing the ratio of the calculated theoretical sum of residuals to the calculated measured sum of residuals; and
down-selecting a rank hypothesis that is a lowest rank corresponding to a certain equality between the calculated theoretical sum of residuals and the calculated measured sum of residuals.

8. The method for rank estimation of electromagnetic emitters of claim 7, further comprising:
establishing an expected measurement noise based on the calculated theoretical sum of residuals.

9. The method for rank estimation of electromagnetic emitters of claim 8, wherein a minimum number of the at least one Gaussian curve that fits the voltage-weighted histogram within the established expected measurement noise is a returned rank of the FSGMM.

10. The method for rank estimation of electromagnetic emitters of claim 1, further comprising:
   preconditioning the AoAs prior to assigning the track to the AoAs.

11. The method for rank estimation of electromagnetic emitters of claim 1, further comprising:
   calculating a hard score;
   calculating a soft score;
   analyzing the calculated hard score and the calculated soft score to check an accuracy of the FSGMM fit before reporting the track associated with the at least one predicted electromagnetic emitter.

12. The method for rank estimation of electromagnetic emitters of claim 11, wherein when the calculated soft score of the rank estimation below a chosen rank is within 4% of the chosen rank, then the rank estimation is reduced to a lower rank.

13. The method for rank estimation of electromagnetic emitters of claim 1, wherein the measuring AoAs from at least one electromagnetic emitter occurs over a time gate window.

14. A non-transitory computer-readable medium storing a plurality of instructions which when executed by one or more processors causes the one or more processors to perform a method for rank estimation of electromagnetic emitters, the plurality of instructions for the method for rank estimation of electromagnetic emitters comprising:
   instructions for measuring Angles of Arrival (AoAs) of a plurality of signals emitted from at least one electromagnetic emitter received at a detection system;
   instructions for providing an estimated accuracy of the AoAs by the detection system;
   instructions for providing an assigned track to one or more of the AoAs;
   instructions for creating a histogram of the AoAs versus azimuth using the estimated accuracy of the AoAs and the assigned track of the AoAs;
   instructions for determining a rank estimation of at least one predicted electromagnetic emitter by fitting a Fixed Sigma Gaussian Mixture Model (FSGMM) to the histogram; and
   instructions for reporting the rank estimation associated with the at least one predicted electromagnetic emitter.

* * * * *